United States Patent [19]
Wright et al.

[11] Patent Number: 5,518,342
[45] Date of Patent: May 21, 1996

[54] MARINE DOCK BUMPER AND TIE LINE STORAGE DEVICE

[76] Inventors: A. Lee Wright; Nancy E. Wright, both of 353 Red Oak, Rochester Hills, Mich. 48307

[21] Appl. No.: 324,235

[22] Filed: Oct. 17, 1994

[51] Int. Cl.⁶ ................................................. B63B 59/02
[52] U.S. Cl. ........................ 405/211; 405/218; 114/219
[58] Field of Search ................................ 405/211, 212, 405/215, 218; 114/219

[56] References Cited

U.S. PATENT DOCUMENTS

| | | |
|---|---|---|
| 2,935,855 | 5/1960 | Reid . |
| 3,449,917 | 6/1969 | Roskopf . |
| 3,486,342 | 12/1969 | Aks ................................. 405/212 |
| 3,950,953 | 4/1976 | Matthews . |
| 3,991,582 | 11/1976 | Waldrop et al. .................. 405/215 X |
| 3,999,399 | 12/1976 | Maurer ............................. 405/215 |
| 4,005,672 | 2/1977 | Files ................................. 405/215 X |
| 4,134,610 | 1/1979 | Lindewall . |
| 4,227,832 | 10/1980 | Leone et al. . |
| 4,338,046 | 7/1982 | Thomerson ...................... 405/212 |
| 4,411,556 | 10/1983 | LeBlanc et al. .................. 405/211 X |
| 4,607,586 | 8/1986 | Taquino ........................... 405/212 X |
| 4,697,956 | 10/1987 | Plaisance ......................... 405/212 X |
| 4,964,760 | 10/1990 | Hartman . |
| 4,968,182 | 11/1990 | Westwell ......................... 405/215 |
| 5,013,272 | 5/1991 | Watkins . |
| 5,018,471 | 5/1991 | Stevens . |
| 5,184,562 | 2/1993 | Hallin . |

*Primary Examiner*—Frank S. Tsay
*Attorney, Agent, or Firm*—Reising, Ethington, Barnard & Perry

[57] ABSTRACT

A protective bumper assembly (20) for a dock post (14) includes an elastomeric pad (24) that is wrapped about the post (14). Tie straps (34) have one end (36) adhered to the pad (24) and a distal end (38) that is long enough to wrap about the post (14) and overlie the adhered end (36). The straps (34) mount two complementary fasteners (37) and (39) to secure the distal end to the adhered end and retain the pad (24) about the post. A hook (50) is secured onto one of the straps. The hook is sized to storably receive an unused tie line (22) for a boat.

8 Claims, 2 Drawing Sheets

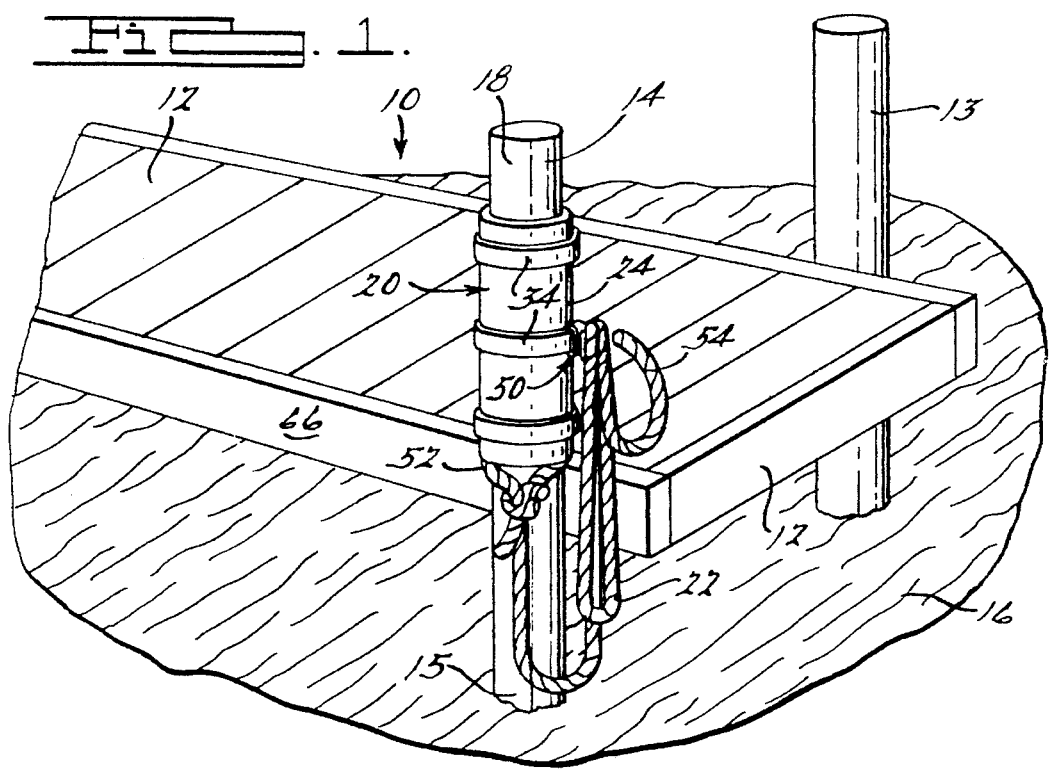
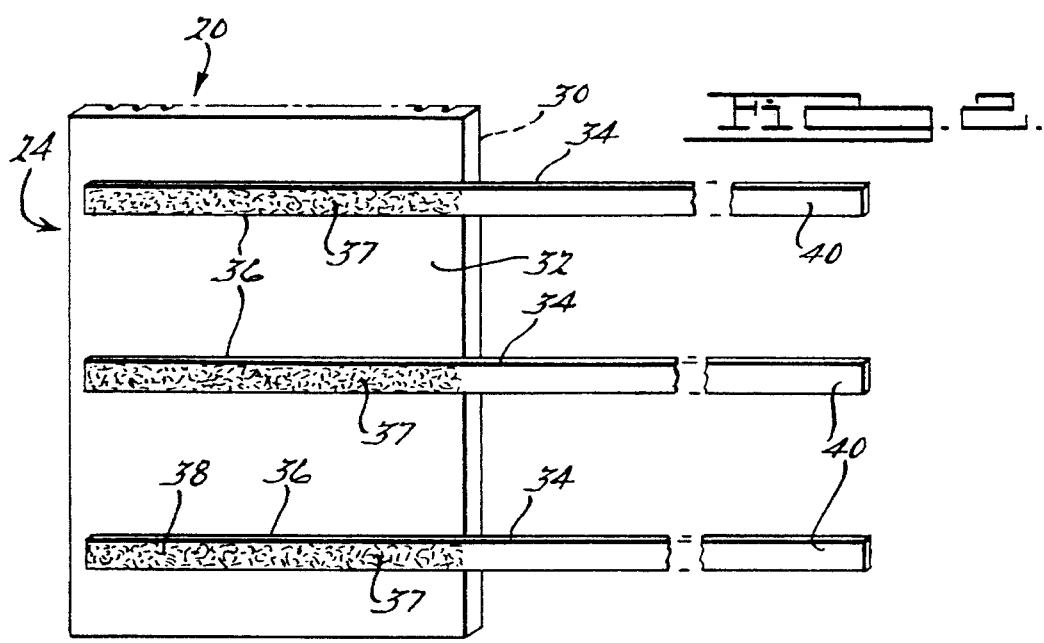
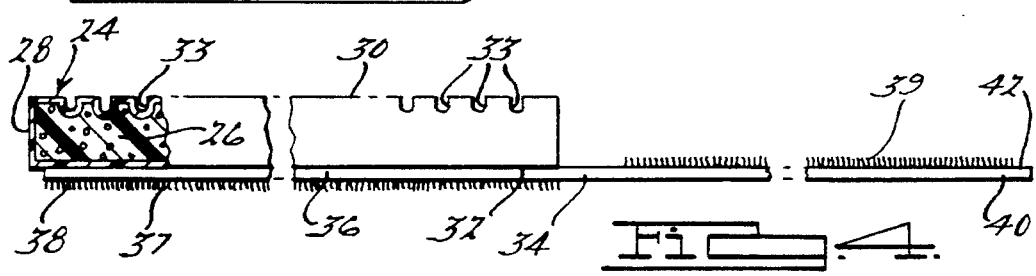

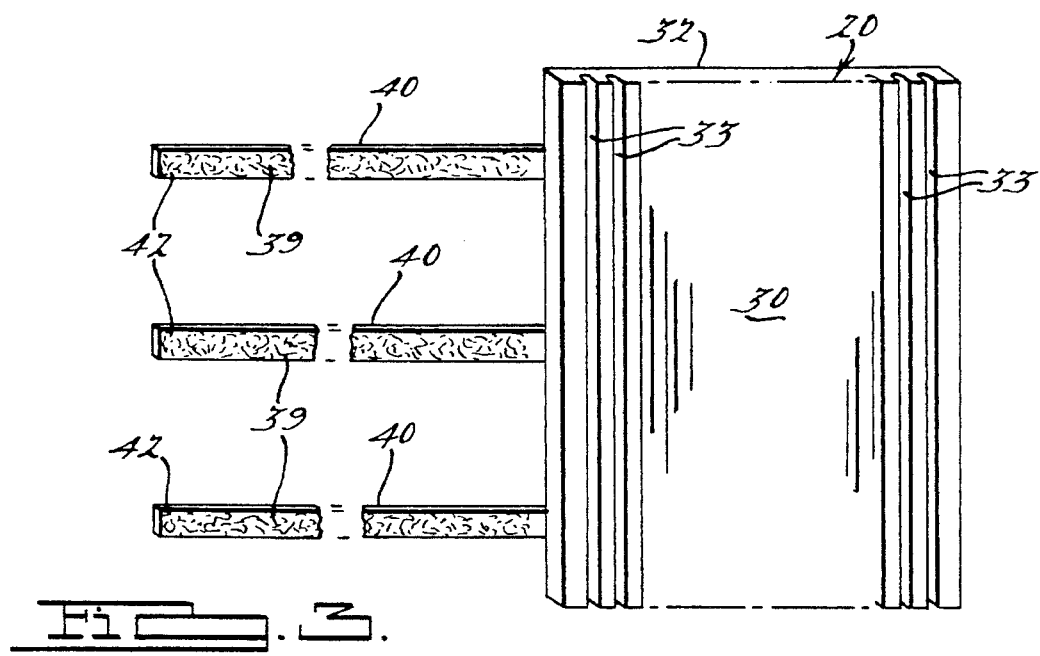
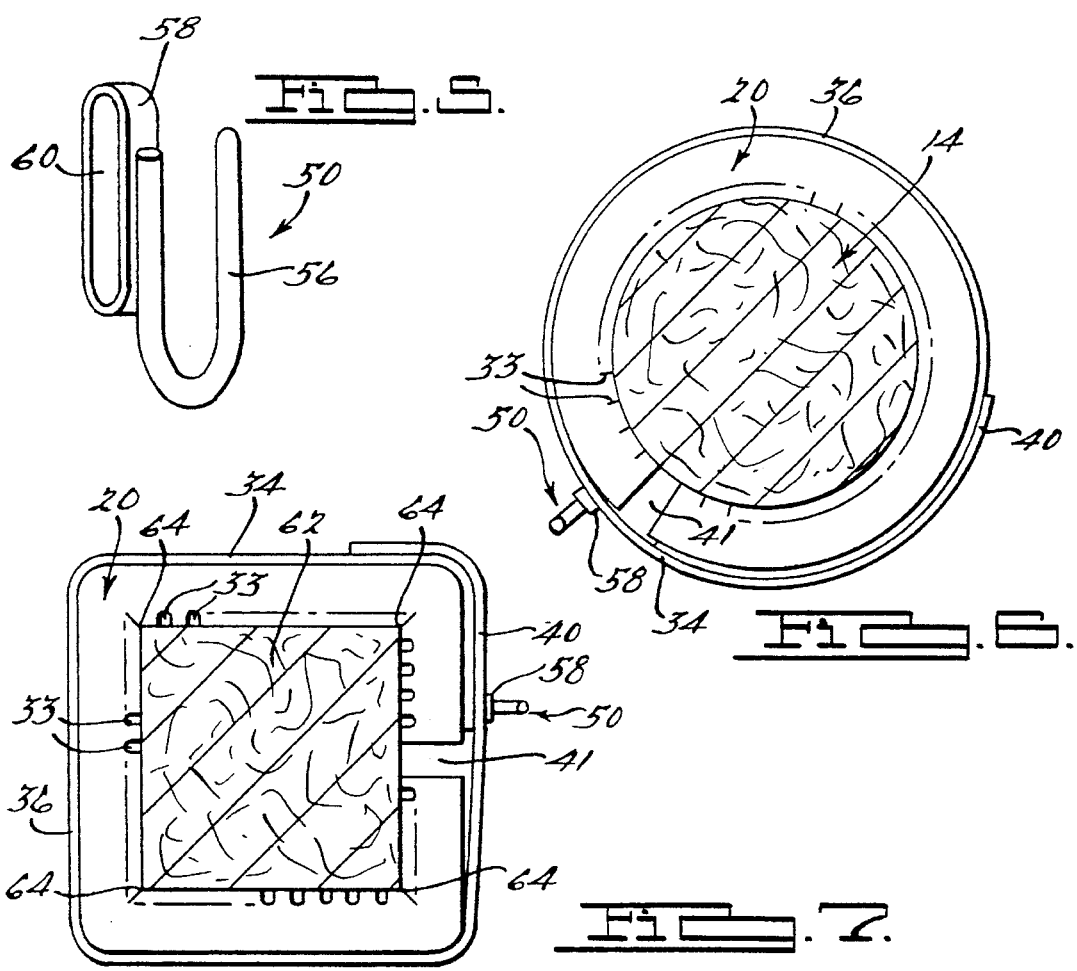

5,518,342

MARINE DOCK BUMPER AND TIE LINE STORAGE DEVICE

TECHNICAL FIELD

The field of this invention relates to protective bumpers for marine docks and hooks for marine tie-lines.

BACKGROUND OF THE DISCLOSURE

Pleasure boating has long been a popular outdoor activity. The boats, ranging from racers, sail boats and yachts, may be moored at various marine docks owned by restaurants, seaside resorts, as well as public and private marinas.

Even though it is common for a pleasure boat to incorporate a rub rail about the top edge of the hull and about the perimeter of the deck, the rub rail is not designed to take the full impact of many bumps encountered against dock posts. Consequently, the dock posts need to have a protective bumper or cushion to protect the boat in conjunction with the rub rail.

Many bumper systems have been developed. Rubber pads that are secured by screws, stakes or nails are often ripped from their fastened position because of the high stresses exerted on the rubber pads about the nail or screw head.

Fenders or portable bumpers have been developed that are mounted on the boat. The disadvantage to these portable systems is two fold. Firstly, in order to be effective, the bumper has to be correctly positioned such that the dock post hits the boat at the fender. It is no easy task to predict where to correctly place the bumper on the boat. Secondly, the boat fender must be transported with the boat during its entire voyage as unnecessary and unused cargo.

Packaging, cushions, carpeting and even corrugated cardboard have been strapped to the dock posts with duct tape in attempts to provide protection to the moored boat. These temporary solutions, however, rapidly degrade and quickly become unsightly.

Many private and commercial marinas also provide tie lines for boats. The dock posts, when properly installed with the dock, commonly extend above the walking surface of the dock. These upper portions of the dock post commonly have one end of the tie line permanently fastened thereto. When the tie line is released from the boat, the tie line is thrown onto the walk surface of the dock, which gets in the way of people, or is thrown into the water. The water, particularly salt water, will cause rapid degeneration of the tie line. Furthermore, it is often inconvenient, when re-docking the boat for a mate to reach down below the walk surface of the dock to retrieve the tie line.

What is needed is a durable yet convenient dock protective cushion that incorporates a hook device for storing the boat tie line.

SUMMARY OF THE DISCLOSURE

In accordance with one aspect of the invention, a protective bumper for a marine dock includes a flexible pad of resilient flexible material with a first side constructed to abut about a dock post and a second outer facing side. The pad is dimensioned to wrap about a substantial perimeter of the dock post. The resilient flexible material of the pad is desirably a blown closed cell polyurethane foam with a formed skin.

A strap is connected to the pad. The strap may have a first section adhered to the second outer facing side or molded within the pad. The first section has a first part of a fastener device. A distal section of the strap has, preferably on an opposite side of the strap, a second part of a fastener device that is connectable to the first part of a fastener device.

Preferably, the first part and second part of the fastener device are complementary parts of a hook and loop fastener device such as Velcro™.

The distal part of the strap is long enough to wrap about the dock post such that the distal section overlaps the first section of the strap.

Preferably, the pad has a plurality of parallel grooves running substantially longitudinally along the first side to provide flexibility of the pad about the periphery of the dock post. The first section of the strap on the outer facing side of the pad runs substantially perpendicular to the grooves on the first side of the pad.

In accordance with another aspect of the invention, a tie line hook storage device for a marine dock includes a strap device with a first section having a first part of a fastener device and a distal section of the strap having a second part of a fastener device. The distal part of the strap is long enough to wrap about a dock post and overlap the first section of the strap such that the second part of the fastener device can connect to the first part. A hook having a distal free hook end is connected to a loop section sized to receive the strap therethrough such that the hook is securable to the strap and constructed to receive a tie line at the dock to elevate a tie line and suspend it above the water line at the dock.

BRIEF DESCRIPTION OF THE DRAWINGS

Reference now is made to the accompanying drawings in which:

FIG. 1 is a perspective fragmentary view of a dock incorporating an embodiment in accordance with the invention;

FIG. 2 is a front perspective view of the bumper before installation on the dock shown in FIG. 1;

FIG. 3 is rear perspective view of the bumper before installation on the dock shown in FIG. 1;

FIG. 4 is a top plan and partially segmented view of the bumper shown in FIG. 3;

FIG. 5 is a perspective view of the hook member shown in FIG. 1;

FIG. 6 is a top plan view of the bumper and hook shown as installed as shown in FIG. 1;

FIG. 7 is a top plan view of the bumper installed on a dock post with a square cross-section.

DETAILED DESCRIPTION OF THE PREFERRED EMBODIMENT

Referring now to FIG. 1, a dock 10 includes a walk platform 12 and a plurality of supporting dock posts 13 and 14. The post 14 has a lower section 15 extending into the water 16 and anchored in the lake bed or sea bed and an upper section 18 extending above the platform 12. The platform 12 is affixed to the posts 13 and 14 in conventional fashion.

The upper section 18 of the post 14 has a bumper assembly 20 wrapped thereabout. As shown in FIGS. 2–4, the bumper assembly 20 includes an elastomeric pad 24 that is rectangular in shape. The pad 24 is made from a blown closed cell polyurethane interior 26 and formed with a cosmetic skin 28. The polyurethane material with a durometer ranging between 18 and 30 are preferred. The pad 24 may be colored as desired and the cosmetic skin 28 can be printed with any desired graphics.

The pad 24 has two major surfaces 30 and 32. One surface 30 being considered an inner side such that when the pad is installed about dock post 14, it abuts the post 14. The surface 30 has a plurality of grooves 33 that longitudinally extend vertically therealong to promote flexibility of the pad 24 about post 14. The grooves 33 can typically be 0.1" (2.54 mm) deep. At least five grooves 33 should run on side 30.

The outer surface or side 32 has a plurality of straps 34 that run horizontally as shown in FIGS. 2 and 3. The straps 34 have a first section 36 connected to the side 32. The adhesion may be by adhesive or the pad 24 may be directly molded to the straps 34. The side 38 of adhered section 36 has a first portion 37 of a Velcro™ fastener system adhered thereto.

The straps 34 have distal ends 40 with an opposing surface 42 thereof mounting a second complementary portion 39 of the Velcro™ fastener system. The distal end 40 is long enough such that it can wrap about the post 14 and pad 24 and overlie the adhered section 36 such that the two Velcro™ hook and loop fastener portions 37 and 39 can be fastened together thus securing the pad 24 about the upper section 18 of post 14 as shown in FIG. 6 with the grooves 33 squeezed down during flexure of the pad 24 about post 14.

The pad 24 by being secured to the upper section 18 is prevented from sliding down into the water 16 by the presence of dock platform 12. The pad 24 may have a width of 19" which is sufficient to completely wrap about a post 14 with a 6" diameter. The pad 24 substantially wraps about larger posts of 7" and 8" diameters and has a small non-functional gap 41 as shown in FIG. 6. Of course, customized pads of larger sizes may be made for the larger posts such that the pads completely wraps about larger posts 14. The bumper assembly 20 can be used to wrap about non-circular posts. Square posts 62 as shown in FIG. 7 are common. The plurality of grooves 33 can accommodate the flexing of the pad about the corners 64 of the post 62.

A hook 50 may be attached about one of the straps 34 to accommodate storage of the tie line 22. As shown in FIG. 1, the tie line has a looped end 52 tied about post 14 below the bumper assembly 20 but above the walk platform 12 of dock 10. The tie line has a free end 54 that is used to tie or moor the boat to the dock. When the tie line 22 is not used to moor the boat, the free end 54 is hooked into hook 50 to store it and retain it out of the water 16.

The hook, as clearly shown in FIG. 5, has its distal hook end 56 sized to freely receive the tie line 22. The hook end 56 is attached or integrally molded with a loop mounting section 58. The loop mounting section 58 has an aperture 60 sized to receive a strap 34 such that after the strap 34 is securely fastened via the Velcro™ fastener system, the hook is retained in place about post 14. The hook 50 preferably is positioned such that the distal hook end 56 parallels the side edge 66 of walk platform 12 and does not protrude into the water beyond the pad 24 and interfere with the cushioning and protective function of the pad 24.

The other post 13 and other dock posts (not shown) may also have pad 20 secured thereabout with or without the hook 50 attached thereto. Only the post 14 that has tie line 22 attached thereto needs to have hook 50 attached as shown for reducing costs of installation.

In this fashion, a protective bumper 20 for a marine dock post 14 can be easily installed to provide sufficient protection for a boat when a boat is moored to the dock and provides for convenient storage of the tie line 22 when there is no boat moored to the dock.

Variations and modifications are possible without departing from the scope and spirit of the present invention as defined by the appended claims.

The embodiments in which an exclusive property or privilege is claimed are defined as follows:

1. A protective bumper for a marine dock characterized by:

a flexible pad of resilient flexible material with a first side constructed to abut against a dock post and a second radially outer facing side opposite said first side of said pad;

said pad being of unitary construction formed with an interior cushion foam structure and an exterior skin and being dimensioned to wrap about a substantial perimeter of said dock post;

a strap comprising a first section connected to said second outer facing side of said pad, said first section including a first part of a fastener device;

a distal section of said strap extending beyond said flexible pad and including a second part of said fastener device that is connectable to said first part of said fastener device; and said distal section of said strap being long enough to wrap about said post of said dock and to overlap said distal section over said first section of said strap and said first part and said second part being disposed on opposite sides of said strap.

2. A protective bumper for a marine dock characterized by:

a flexible pad of resilient flexible material with a first side constructed to abut against a dock post and a second radially outer facing side opposite said first side of said pad;

said pad dimensioned to wrap about a substantial perimeter of said dock post;

a strap comprising a first section connected to said second outer facing side pad of said first section including a first part of a fastener device;

a distal section of said strap extending beyond said flexible pad and including a second part of said fastener device that is connectable to said first part of said fastener device;

said distal section of said strap being long enough to wrap about said post of said dock and to overlap said distal section over said first section of said strap and said first part and said second part disposed on opposite sides of said strap; and said first part and second part of said fastener device being complementary parts of a hook and loop fastener device, and said first part and said second part being disposed on opposite sides of said strap.

3. A protective bumper as defined in claim 2 further characterized by:

said first section of said strap on said second outer facing side of said pad being attached to said pad to run substantially perpendicular to a plurality of grooves on said first side of said pad.

4. A protective bumper as defined in claim 2 further characterized by:

said pad having in its first side a plurality of parallel grooves running substantially longitudinally along said first side to provide flexibility of said pad about the periphery of said post.

5. A protective bumper as defined in claim 1 further characterized by:

said resilient flexible material of said pad being a blown closed cell polyurethane foam with a formed skin.

6. A protective bumper for a marine dock characterized by:

a flexible pad of resilient flexible material with a first side constructed to abut against a dock post and a second radially outer facing side opposite said first side of said pad;

said pad dimensioned to wrap about a substantial perimeter of said dock post;

a strap comprising a first section connected to said second outer facing side pad of said first section including a first part of a fastener device;

a distal section of said strap extending beyond said flexible pad and including a second part of said fastener device that is connectable to said first part of said fastener device;

said distal section of said strap being long enough to wrap about said post of said dock and to overlap said distal section over said first section of said strap and said first part and said second part disposed on opposite sides of said strap; and a hook having a distal free hook end connected to a loop section sized to receive said strap therethrough such that said hook is securable to said pad and constructed to receive a tie line at said dock to elevate said tie line and suspend it above the water line at said dock.

7. A tie line hook storage device for a marine dock characterized by:

a flexible pad of resilient flexible material with a first side constructed to engage a dock post above a walkway of said dock;

said pad having a second outer facing side opposite said first side of said pad;

said pad dimensioned to wrap about a substantial perimeter of said dock post above said walkway;

a strap comprising a first section connected to said second outer facing side of said pad, said first section including a first part of a fastener device;

a distal section of said strap extending beyond said pad and including a second part of said fastener device that is connectable to said first part of said fastener device;

said distal section of said strap being long enough to wrap about said dock post to overlap said distal section over said first section of said strap; and a hook having a distal free hook end connected to a loop section sized to receive said strap therethrough such that said hook is securable to said pad and constructed to receive a tie line at said dock to elevate said tie line and suspend it above the water line at said dock.

8. A tie line hook storage device for a marine dock characterized by:

a strap device comprising a first section connected to a first part of a fastener device;

said strap comprising an axially spaced second section connected to a second part of said fastener device that is connectable to said first part of said fastener device; and said strap being long enough to wrap about a dock post and overlap said first and second sections of said strap;

a hook having a distal free hook end connected to a loop section sized to receive said strap therethrough such that said hook is securable to said strap and constructed to receive a tie line at said dock to elevate said tie line and suspend it above the water line at said dock.

* * * * *